UNITED STATES PATENT OFFICE.

NELS GORANSON, OF QUEENSBOROUGH, NEW WESTMINSTER, BRITISH COLUMBIA, CANADA.

FOOD PRODUCT.

1,319,953.     Specification of Letters Patent.     Patented Oct. 28, 1919.

No Drawing.     Application filed September 19, 1918. Serial No. 254,778.

*To all whom it may concern:*

Be it known that I, NELS GORANSON, a subject of the King of Sweden, residing at Queensborough, New Westminster, in the Province of British Columbia, Canada, have invented certain new and useful Improvements in Food Products, of which the following is a specification.

This invention relates to a food product which has been particularly designed to supply a valuable nutritive and palatable food from what is at present a waste product.

In the cleaning of salmon and other fish for canning, the roe is thrown aside as offal, largely because the strong tough skin with which the egg is enveloped is found to be objectionable in the use of the roe as food, although it has highly nutritive properties, which in these days of close conservation of food it is desirable should be utilized.

By subjecting the roe to the treatment set forth in the following specification, all the hard roe and a considerable proportion of the soft roe are converted into a readily salable food product.

The treatment is fully set forth in the following specification.

The hard roe is passed through a crusher to burst the egg envelop and liberate the fluid contents. The liquid is then strained from the crushed roe through a fine mesh screen and the strained liquid is mixed with a small proportion of the soft roe and with a proportion of gelatin obtained from boiling the heads of the fish.

The proportion of the soft roe and of gelatin is such that when the product is boiled it may have a plastic consistency, such that it may be readily served and spread.

This fluid product is salted and spiced to taste and is filled into containers and cooked in a manner similar to that followed in the canning of fish; that is, the filled containers have their covers loosely applied and are exposed to steam heat for a sufficient time to expel the air. The containers are thereafter hermetically sealed and are again subjected to steam heat in closed retorts for about thirty minutes, by which time the contents of the can are fully cooked and the product is ready for the market.

The important feature of the process is the crushing and straining of the hard roe prior to cooking and further the admixture with the strained liquid of a limited amount of soft roe and of fish gelatin, with flavoring to taste and to the requirements of use.

I am aware that prior to my invention a limited amount of the roe of certain fish has been used as food but without any attempt at suitable preparation. As a consequence enormous quantities are thrown to waste.

It must be borne in mind that the Pacific salmon is caught off the coast where the fish are returning to their native rivers to spawn, so that the roe forms a not inconsiderable part of the fish waste.

Having now particularly described my invention, I hereby declare that what I claim as new and desire to be protected in by Letters Patent, is:

1. A food product consisting of a mixture of the liquid expressed from the hard roe of fish, a small proportion of the soft roe, a small proportion of fish gelatin, salt and spices.

2. The method of producing a food product which comprises crushing raw hard or female roe, straining the juice therefrom, adding thereto a small proportion of soft or male roe and fish gelatin, salting and flavoring to taste and boiling the same.

In testimony whereof I affix my signature.

NELS GORANSON.

Copies of this patent may be obtained for five cents each, by addressing the "Commissioner of Patents, Washington, D. C."